Jan. 19, 1965 L. O. VARGADY 3,166,626
OPTICAL READ-OUT SYSTEM HAVING A ROTATABLE OPTICAL
DEVIATING ELEMENT OF VARIABLE WALL THICKNESS
Filed June 4, 1962

INVENTOR.
LESLIE O. VARGADY
BY
ATTORNEYS

United States Patent Office 3,166,626
Patented Jan. 19, 1965

3,166,626
OPTICAL READ-OUT SYSTEM HAVING A ROTATABLE OPTICAL DEVIATING ELEMENT OF VARIABLE WALL THICKNESS
Leslie O. Vargady, Rochester, N.Y., assignor to Bausch & Lomb Incorporated, Rochester, N.Y., a corporation of New York
Filed June 4, 1962, Ser. No. 199,709
4 Claims. (Cl. 88—1)

This invention relates to an optical read-out system for indicating relatively small changes in the position of a movable element and more particularly to an optical micrometer.

Optical micrometers generally include means for projecting an image of a scale onto an image plane. A second scale adjacent to the image of the projected scale lies in this image plane, and moves together or is linked to an optical deviating element. This optical deviating element may be a tilted plan parallel plate, a sliding wedge or a lens. The optical deviating element displaces the image of the primary scale relative to a fixed index line. The common images of a primary and a micrometer scale are projected then to a viewing device; screen, or eyepiece.

The present invention relates to a novel optical micrometer having a circular arrangement of the optical deviating element. This arrangement produces definite advantages for example, it provides a relatively long scale, which is rotatable around an axis. This convenient arrangement can be advantageously used in lieu of a sliding component for measuring linear displacement of the primary scale. The rotating component offers an advantage since the accuracy of a rotating element is more easily controlled than the accuracy of a long sensitive movement.

A system according to the present invention is relatively compact, durable in use and incorporates a relatively simple mechanical movement. The simplicity of the mechanical movement tends to offset the relatively high cost of the novel deviating element. This relatively high cost is also offset by the improved accuracy and other desirable features inherent in a system of this type. Furthermore the improved results warrant additional investigation to reduce the manufacturing costs of the element. A further reduction in cost would be effective in providing an improved optical micrometer at a commercially advantageous cost.

Briefly, an optical read-out system according to the present invnetion includes a circular scale, an image plane and means including a light source for projecting an image of a scale onto the image plane. A rotatably optical deviating element including a curved surface of progressively increasing or decreasing thickness is placed in the ray path. The circular scale and the curved surface of the deviating element have a more or less common axis. Rotation of the element displaces the ray path as the element is rotated. The element may be considered to be an eccentric cylinder or a segment thereof such as a curved wedge.

The deviation of a ray is dependent upon the thickness of the element at the point through which the ray passes. As the element is rotated from a relatively narrow portion to a relatively thicker portion or from a relatively thick portion to a relatively narrow portion the deviation of the ray is increased or decreased respectively due to the known image deviating properties of wedges in an optical ray path.

The invention will now be described in more detail in connection with the accompanying drawings in which.

Figure 1:
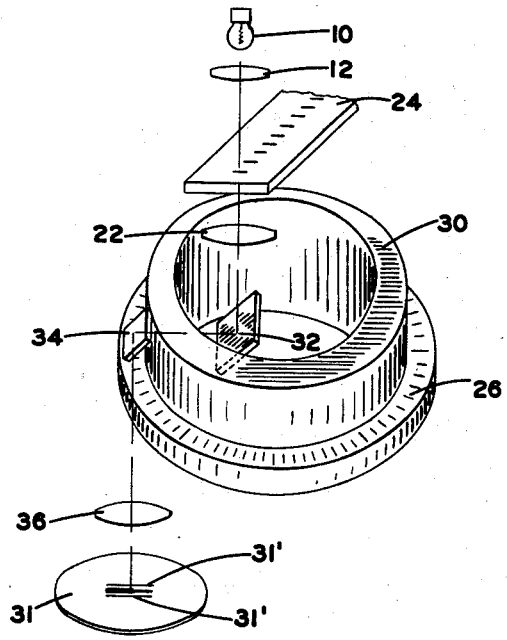
FIG. 1 is a schematic perspective view illustrating a first embodiment of the invention.
Figure 2:
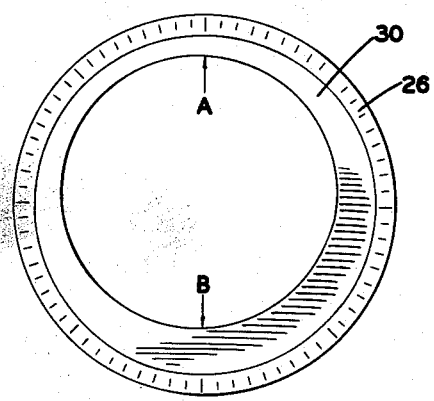
FIG. 2 is a top plan view of the eccentric element shown in FIG. 1.

An optical read-out system according to a first embodiment of the invention is shown in FIGURES 1 and 2. The system includes projection means such as a light source 10 and condenser lens 12. A primary scale 24 is located in the ray path between the lens 12 and an objective lens 22.

The scale 24 moves with respect to a movable element (not shown) in order to indicate relatively small changes in the position of the movable element. A circular scale 26 comprising a transparent base and opaque divisions is fixed to an eccentric element 30. The element 30 has a generally cylindrical shape including a curved surface of progressively increasing or decreasing thickness and the scale 26 lies in a plane normal to the axis of the cylinder. The thickness increases from "A" to "B," FIGURE 2 and decreases from "B" to "A." The scale divisions of the scale 26 are located about the periphery of the element 30.

An image of the primary scale 24 is projected through the eccentric optical element 30 to a screen 31. The element 30 causes a slight displacement of the imaging rays due to be known image deviating properties of wedges in an optical ray path. The optical element 30 is preferably fixed to the circular scale 26 and has a common axis of rotation therewith.

A pair of mirrors 32 and 34 are disposed on each side of the element 30 in order to reflect the imaging light rays through the element 30 and the scale 26. The imaging rays are reflected about 90° by each of the mirrors 32 and 34. The image of a scale division from the primary scale 24 is projected with an image of a scale division from the circular scale 26 through the objective lens 36 and onto the screen 31. The screen 31 includes a pair of index lines 31'. The element 30 displaces the image of the primary scale relative to the index line 31'. The common images of the primary scale 24 and the circular scale 26 are projected onto the screen 31.

A top plan view of the eccentric element 30 and scale 26 are shown in more detail in FIG. 2. The center of the circular scale is approximately coincident with the common axis of rotation. In the preferred embodiment the axis of rotation passes through the center of the scale 26.

Figure 4:
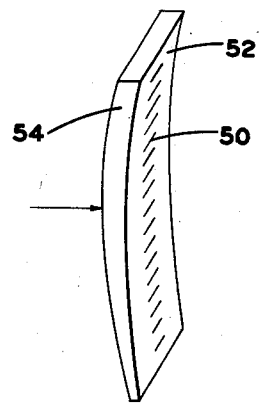

A circular scale as used hereinabove and hereinafter includes not only angularly spaced radially extending divisions but also angularly spaced parallel divisions such as those illustrated in FIGURE 4. In all cases however, the circular scale is rotated about an axis which passes through the approximate center about which the circular scale divisions are spaced i.e. through the area defining the approximate center of the circular scale.

Figure 3:
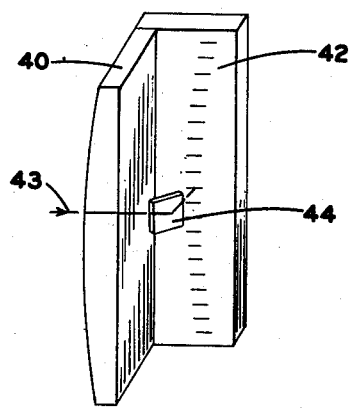
FIG. 3 is a perspective view illustrating a second embodiment of the invention, and, FIG. 4 is a perspective view illustrating a third embodiment of the invention.

An optical system according to a second embodiment of the invention is shown in FIGURE 3 and includes a circular scale 42 and an optical deviating element 40. The element 40 and scale 42 are arranged in a system generally similar to the arrangement shown in FIGURE 1. The deviating element according to the second embodiment of the invention includes a segment of a cylinder having a curved surface of progressively increasing thickness. The thickness may be gradually increased to a selected thickness and then decreased. A mirror 44 is placed between the deviating element 40 and scale 42 and adapted for reflecting an image of a primary scale (not shown) through the scale 42.

In operation an image of a scale (not shown) is projected along a ray path 43 in the direction of the arrow. The image is projected through the element 40 and by way of the mirror 44 through the scale 42. The combined image is formed on a screen (not shown).

In the third embodiment a circular scale 50 is formed on a back surface 52 of the optical deviating element 54. The rear surface 50 has a radius located at the center of the circular scale. An image of a primary scale (not shown) is projected through the integral scale deviating element in the direction shown by the arrow and a combined image is formed on a screen (not shown).

What is claimed is:

1. An optical read-out system comprising a primary scale, an image plane, and projecting means including a light source for projecting an image of said primary scale onto said image plane, a rotatable optical deviating element including a curved wall of progressively increasing radial thickness located in the ray path between said primary scale and said image plane, and a circular scale located in the projection ray path between said optical deviating element and said image plane, said element and said circular scale rotatable about an axis passing through an area defining the approximate center of said circular scale whereby an image of the circular scale is projected onto the image plane together with an image of the primary scale and the relative positions of the two images are displaced by said element.

2. An optical read-out system comprising a primary scale, an image plane, and projecting means including a light source for projecting an image of said primary scale onto said image plane, a rotatable cylindrical optical deviating element including a curved wall of progressively increasing radial thickness located in the ray path between said primary scale and said image plane, and a circular scale located in the projection ray path in a plane normal to the axis of said cylindrical optical deviating element, said circular scale including radial scale divisions located around the outer periphery of said deviating element and said element and said circular scale rotatable about an axis passing through an area defining the approximtae center of said circular scale whereby an image of the circular scale is projected onto the image plane together with an image of the primary scale and the relative position of the two images are displaced by said element.

3. An optical read-out system comprising a primary scale, an image plane, and projecting means including a light source for projecting an image of said primary scale onto said image plane, a rotatable optical deviating element having a shape generally similar to the segment of a cylinder and including a curved wall of progressively increasing radial thickness located in the ray path between said primary scale and said image plane a circular scale located in the projection ray path in a plane normal to the axis of said optical deviating element, said circular scale and said element rotatable about an axis passing through an area defining the approximate center of said circular scale whereby an image of the circular scale is projected onto the image plane together with an image of the primary scale and the relative position of the two images are displaced by said element.

4. An optical read-out system according to claim 1; in which, the optical deviating element includes angularly spaced parallel scale divisions formed on the rear surface thereof with respect to an entrant light ray to thereby form the circular scale.

References Cited in the file of this patent

UNITED STATES PATENTS

| | | |
|---|---|---|
| 1,719,552 | Karnes | July 2, 1929 |
| 2,566,875 | Dietrich et al. | Sept. 4, 1951 |